United States Patent Office 3,793,302
Patented Feb. 19, 1974

3,793,302
FILM-FORMING COMPOSITION COMPRISING A SILICA-UREA FORMALDEHYDE POLYMER FLATTING AGENT
Gregor Berstein, Newton, John F. Hardy, Andover, and Leonard H. Doppler, Lexington, Mass., assignors to Cabot Corporation, Boston, Mass.
No Drawing. Original application Oct. 12, 1971, Ser. No. 188,563, now Patent No. 3,714,085. Divided and this application Nov. 24, 1972, Ser. No. 309,173
Int. Cl. C08b 21/12; C08g 51/04; C08h 17/02
U.S. Cl. 260—15
14 Claims

ABSTRACT OF THE DISCLOSURE

This disclosure relates to the use of a combination of non-porous materials comprising a certain group of urea-formaldehyde polymers and a certain group of pyrogenically prepared colloidal silicas as flatting additives in the preparation of flatted compositions such as paints, lacquers, varnishes and the like.

---

This is a division of application Ser. No. 188,563, filed Oct. 12, 1971 and now Pat. No. 3,714,085.

This invention relates to new and improved flatted and semi-gloss compositions having desirable physical properties such as stability of gloss and good dispersion. More particularly, this invention is concerned with novel flatted and semi-gloss compositions comprising a film-forming organic material, an organic solvent and as a flatting additive an effective amount of a combination comprising certain urea-formaldehyde polymers and certain colloidal silicas as hereinafter described.

It is well known that many systems require a matte or semi-matte finish, such as in the field of wood products including prefinished paneling, flooring, furniture and the like. In order to impart such finishes, it is necessary to employ flatting agents capable of imparting such characteristics. Accordingly, flatting agents are conventionally used in varnishes, lacquers and the like to prepare compositions which when applied to a base substrate such as wood yield a delustered finish or produce a finished surface having reduced gloss. The conventionally used flatting agents comprise finely divided particles capable of diffusing light reflections and thereby reducing the gloss of the compositions. Among the varied materials which have heretofore been employed as flatting agents there are included natural materials such as gums, resins and siliceous materials, and synthetic materials such as metallic soaps and finely divided siliceous materials.

The most widely used flatting agents have been silica gels of the type commonly referred to as silica aerogels wherein the original gel structure is maintained, and silica gels of the type known as silica xerogels wherein the original gel structure is destroyed. While the silica gels are used extensively in various applications, there are, however, several disadvantages related thereto. For example, a major disadvantage of silica gel flatting agents is the tendency on standing to cause a settling out from the flatted composition of a solid precipitate containing the silica. Before the flatted composition may be used, it is therefore essential that the solid layer of settled out material be redispersed throughout the composition. It has been found extremely difficult to redisperse this precipitate and, in some instances, attempts to redisperse the precipitate have failed completely. A further disadvantage of the prior art conventionally employed flatting agents involves the porosity of such agents which necessitates grinding prior to usage. The grinding action has been found to affect adversely the reproducibility of the desired flatting effect.

It is, accordingly, a principal object of the present invention to provide a novel combination of non-porous materials which require no grinding to impart desired flatting effects.

It is also an object of this invention to provide a novel combination of certain non-porous urea-formaldehyde polymers and certain non-porous colloidal silicas which is useful, without grinding, as a flatting additive for preparing delustered clear finishes.

It is a further object of this invention to provide a novel combination of certain non-porous materials which impart desired flatting characteristics merely by varying the ratio of the components of the combination.

It is also an object of this invention to provide novel and improved flatted or delustered finish compositions wherein the flatting additive comprises a combination of certain non-porous urea-formaldehyde polymers and certain non-porous colloidal silicas.

It is a further object of this invention to provide novel and improved delustered clear finish compositions, particularly varnishes and lacquers, wherein reproducible gloss effects are achieved as a result of having only to stir in the flatting agents and thereby eliminate the necessity for pebble milling or grinding.

Other and different objects, advantages and features of the present invention will become apparent to those skilled in the art upon consideration of the following detailed description and claims.

In accordance with the invention, it has been found that the above and still further objects are achieved by the utilization of a certain group of non-porous urea-formaldehyde polymers in combination with a certain group of non-porous colloidal silicas as a formulated flatting additive in the preparation of the present delustered coating compositions, including paints, lacquers and varnishes. As noted previously, the novel combinations of the present invention comprising two specific non-porous materials necessitate only a stirring-in or dispersing action rather than a grinding or milling action and, therefore, impart to resultant compositions containing such blends a high degree of reliability for obtaining reproducible gloss readings.

Generally speaking, the amount of the novel combination flatting additive employed in the preparation of the flatted and semi-matte compositions of the present invention may vary over a wide range with the sole requirement that the amount used be sufficient to decrease or deluster the gloss of the composition without adversely affecting the clarity of the composition. It is obvious, therefore, that the amount of flatting additive to be employed depends upon several factors including the particular film-forming organic solid employed, the amount of organic solvent used, and the extent of flatting desired. Normally, however, amounts ranging from about 5 to about 30 percent by weight of the combined flatting additive, based upon the weight of the film-forming organic material, are utilized in the preparation of the flatted compositions. Furthermore, the additive combination is comprised of an amount varying from about 20 to about 80 percent by weight based on weight of the total combination of the non-porous urea-formaldehyde pollmer and an amount of from about 80 to about 20 percent by weight based on the weight of the total combination of the non-porous colloidal silica. In a preferred embodiment, however, the additive combination comprises an amount of from about 40 to about 60 percent by weight of the non-porous urea-formaldehyde based on the weight of the total combination and an amount of from about 60 to about 40 percent by weight of the non-porous colloidal silica based on the weight of the total combination.

The film-forming organic polymeric materials suitable for use in preparing the present composition, particularly varnishes and lacquers, include the following. Oil varnishes which are unpigmented oil-base paints comprise a solvent such as turpentine or petroleum naphtha and a binder that forms a film by oxidation or polymerization such as drying oils alone or in combination with natural or synthetic resins, chlorinated rubber and the like. Spirit varnishes which are suitable for use with the present invention are composed of a solvent such as methanol, methyl isobutyl ketone, butyl acetate, toluene, or the like and a binder that forms a film by evaporation of the solvent such as the shellac, cellulose ester or ether, alkyd and phenolic resin varnishes. Specific examples of drying oil varnishes include unsaturated fatty oil resin varnishes such as linseed oil and tung oil varnishes; natural resin unsaturated fatty oil varnishes such as rosin-linseed oil or rosin-tung oil varnishes; synthetic resin unsaturated fatty oil or alkyd varnishes such as maleic ester gum, modified phenolic or modified resin-pentaerythritol resin in combination with unsaturated fatty oils such as linseed oil or tung oil. The alkyd resins contemplated, as described in "The Condensed Chemical Dictionary" (6th ed., 1961), are generally prepared by the union of dibasic acids or anhydrides, especially phthalic anhydride, with a polybasic alcohol such as glycerine. Modification of the alkyd resins may be accomplished by using other anhydrides such as maleic anhydride, dibasic acids, glycols, polyols or other substances the most common and notable of which are various natural oils or the acids derived therefrom. The use of linseed oil or linoleic acid or similar drying oil materials results in an oxidizing alkyd, while the use of essentially saturated oils and their derivatives produces non-oxidizing alkyd resins.

Also suitable for use with the process of the present invention are lacquer compositions which are solvent-base paints that form a film by evaporation of the solvent employed such as acetone, ethyl alcohol, methyl isobutyl ketone, ethyl acetate, butyl acetate, benzene, toluene or xylene. Among the binders or film-forming constituents of the lacquer compositions are cellulose esters or ethers such as cellulose acetate-acetone lacquer; maleic rosin lacquer; nitrocellulose lacquers often in combination with alkyd resins; polyvinyl chloride lacquers, vinyl chloride-vinyl acetate copolymer lacquers; and acrylic lacquers. The acrylic lacquers which are particularly suitable for use herein may be defined as essentially non-aqueous or solvent type systems in which the major portion of the resin is a thermoplastic or thermosetting acrylic resin produced by the polymerization of monomers such as acrylic acid, methacrylic acid, and their derivatives, with or without minor amounts of other compatible monomers. Examples of typical resins of this type are acrylic acid, methacrylic acid, methyl acrylate, ethyl acrylate, 2-ethylhexyl acrylate, methyl methacrylate, ethyl methacrylate, n-butyl methacrylate, isobutyl methacrylate, n-hexyl methacrylate, n-octyl methacrylate, n-lauryl methacrylate, n-tetradecyl methacrylate, n-hexadecyl methacrylate and the like. These monomers are merely typical of those known to the art and described in "Organic Coating Technology" by Payne (Wiley and Sons, New York, 1954). For example, many other homologs of these monomers can be used in the present invention as well as copolymers of such monomers. Other ingredients which can be included in the acrylic type resin are additional resins such as melamine, styrene, epoxy or other such compatible resins or mixtures thereof. In such modified acrylic resins systems, the proportion of acrylic monomer to melamine, epoxy or other resin may vary depending upon the properties desired in the finished product but the acrylic resin component generally comprises the major constituent of the resin product.

Also particularly well suited for use in the present invention are polyurethane resins of both the thermoplastic or thermosetting types. The polyurethane resins are formed by reacting an isocyanate such as toluene diisocyanate or diphenylmethane-4,4'-diisocyanate with a hydroxyl group-containing material such as polyethers, especially polyoxypropylene, polyesters, castor oil, monoglycerides, diglycerides or glycols.

The urea-formaldehyde component of the combined flatting additive is a polymer characterized as being non-porous, infusible, insoluble, particulate and having a molar ratio of urea to formaldehyde ranging from about 1:1 to about 1:2 and a specific surface area ranging from about 5 to about 100 m.$^2$/g. In a preferred embodiment, however, the non-porous, insoluble, infusible particulate urea-formaldehyde has a molar ratio ranging from about 1:1 to about 1:2 and a specific surface area ranging from about 50 to about 80 m.$^2$/g. The urea-formaldehyde polymeric products of the present invention are readily prepared by any of several methods known to the art. For example, the non-porous, insoluble, infusible products may be obtained by utilizing a single stage process or a two stage process, in both of which instances the polymers are prepared so as to contain the desired molar ratios of urea to formaldehyde. In more detail, the two stage process entails initially reacting urea with formaldehyde in an aqueous solution to form a soluble and fusible precondensate, and thus to produce in the presence of a suitable curing catalyst and at elevated temperatures an insoluble and infusible product which may form a gel or a precipitate. Alternatively, when utilizing the single stage process, all of the reactants and process additives are added at the outset and the reaction proceeds directly until a cross-linked, insoluble and infusible polymer gel is formed. In each instance the resultant polymer gel is neutralized and recovered by filtration or centrifugation and is dried by any conventional technique such as spray drying, air drying, azeotropic distillation or other means for effectuating contact and convection drying. Depending on the reaction conditions employed, the insoluble and infusible reaction products may be produced directly in comminuted form as a powder or a granulate. In the event that the reaction product is not obtained in such a form, the product may be comminuted or deagglomerated to a finely divided form utilizing any suitable means such as a ball mill, a pounding mill, a roller mill, an impact mill or an air jet mill.

The acid curing cataysts suitable for use in preparing the insoluble, infusible, non-porous urea-formaldehyde polymers of the present invention include any of the conventional acid catalysts such as sulfuric acid, phosphoric acid, hydrochloric acid, nitric acid; organic acids of medium strength having a pK value less than 4 such as formic, oxalic, maleic, succinic and chloroacetic acids; and the like. It is preferred, however, to employ as the acid curing catalyst sulfamic acid or a water-soluble ammonium hydrogen sulfate having the general formula, $RNH_3SO_4H$, wherein R is a radical selected from the group consisting of hydrogen, alkyl, cycloalkyl, hydroxyalkyl, aralkyl or aryl. Exemplary water-soluble ammonium hydrogen sulfates are ammonium hydrogen sulfate, methylammonium sulfate, phenylammonium hydrogen sulfate, benzylammonium hydrogen sulfate and the like.

In an optional preferred embodiment of the present invention, water-soluble macromolecular organic substances which greatly increase the viscosity of aqueous solutions, referred to hereinafter as protective colloids, may be present in the reaction mass during the precipitation of the urea-formaldehyde condensation products. Typical examples of such protective colloids are natural substances such as starch, gelatin, glue, tragacanth and gum arabic; modified natural substances such as carboxymethylcellulose, the alkali metal salts of carboxymethylcellulose, particularly the sodium salt of carboxymethylcellulose, methylcellulose, ethylceliuose, betahydroxyethylcellulose, alkali metal alginates and the like, synthetic polymers such as polyvinyl alcohol, polyvinyl pyrrolidone, water-soluble polymers and copolymers of acrylic or methacrylic acids and alkali metal salts thereof, salts of maleic acid-containing copolymers, styrene-maleic anhydride copolymers, polyhydrochlorides of homopolymers and copolymers of vinylpyridine and the like. The amounts of protective colloids to be employed are dependent on the type, chemical structure and molecular weight thereof. However, the protective colloids are generally used in amounts ranging from about 0.1 to about 10 percent by weight based on the weight of the urea and formaldehyde reactants. Preferably, amounts of the protective colloid ranging from about 0.5 to about 5 percent by weight based on the weight of the urea and formaldehyde reactants are used. In practice, the protective colloid may be added, in the case of the single stage process for preparing the polymers, to the precondensate of urea and formaldehyde at any stage of the wet end of the manufacturing process. Alternatively, with similarly advantages results, the protective colloid may be added after the formation of the urea-formaldehyde precondensate in a two stage process for preparing the insoluble, infusible urea-formaldehyde polymers.

In a further preferred embodiment of the present invention, the urea-formaldehyde polymers useful in preparing flatting additives are prepared by a process which entails the use of sulfamic acid or a water-soluble ammonium hydrogen sulfate as hereinbefore defined as a curing catalyst in combination with a protective colloid in the conversion of a precondensate of urea and formaldehyde into a crosslinked gel. In more detail, a precondensate of urea and formaldehyde having a molar ratio of from about 1:1 to about 1:2 of urea to formaldehyde is formed at a temperature varying from about 40 to about 100° C. and at a pH range of from about 6 to about 9 and for a period of time sufficient to permit the greater portion of the formaldehyde to be reacted with the urea. A protective colloid, such as the sodium salt of carboxymethylcellulose, is added to the precondensate at any time during the production thereof, or is added separately as a solution to an initially prepared precondensate. To the resultant precondensate there is then added, with agitation, a solution of sulfamic acid or a water-soluble ammonium hydrogen sulfate at a temperature ranging from room temperature to about 100° C. until a crosslinked gel is formed. The gel is subsequently comminuted in an extruder or a cutter-granulator and the precipitate is separate by filtration or centrifugation. The resultant reaction product, which is a solid, infusible and insoluble urea-formaldehyde polymeric condensation product, is neutralized and dried by any conventional technique such as air drying and is then deagglomerated by means of an impact mill, an air jet mill or a ball mill.

The specific group of silicas useful in preparing the combination flatting additive of the present invention include non-porous, pyrogenically prepared silicas having a surface area ranging from about 30 to about 100 m.$^2$/g., and more preferably, a surface area ranging from about 40 to about 60 m.$^2$/g. In particular, the silicas contemplated for use herein are prepared pyrogenically by the high temperature hydrolysis and/or oxidation of a volatilized silicon-containing compound such as silicon tetrachloride and are generally classified as fumed silicas. The fumed silicas comprise particles of spherical shape and are of exceptional purity in that the silica content is 99.8 percent.

As mentioned earlier, the components of the combination comprise an amount of from about 20 to about 80 percent by weight urea-formaldehyde polymer based on the weight of the combination and an amount of from about 80 to about 20 percent by weight of fumed silica. The preferred embodiments of this invention, as recited hereinbefore, involve combinations comprising amounts of from about 40 to about 60 percent by weight of urea-formaldehyde polymer and amounts of from about 60 to about 40 percent by weight of fumed silica based on the weight of the combination. The manner in which the urea-formaldehyde polymer and fumed silica components are combined to form the novel flattening agent compositions of the present invention is not critical. For example, the components may be readily combined by simple dry mixing methods known to the art, such as tumble mixing. Alternately, the blending of the components may also be accomplished in situ, i.e., in the system which is to be flattened or delustered, regardless of whether the urea-formaldehyde polymer and fumed silica are dispersed or stirred-in separately or together into the film forming system. Moreover, the order of addition of the urea-formaldehyde polymer and the fumed silica to the film-forming polymeric material is of no particular significance.

In general, the delustered compositions of this invention are readily prepared by dispersing the novel flatting additive formulations in the compositions to be delustered. The flatting additive may be dispersed by simply stirring the additive into the film-forming composition using any conventional means for stirring such as a Waring Blender. It is to be noted that conventional flatting agents normally require grinding by means of a pebble mill, two roller mill or the like, to effectuate dispersion thereof into the composition to be flatted whereby the reproducibility of gloss values is adversely affected. In the present case, however, the use of the novel flatting combination comprised of two specific non-porous materials of suitable sizes and complementary properties eliminates the necessity of any grinding action to achieve the desired flatting effect and obtain a high degree of reproducibility of gloss values. With respect to the percent solids of the resultant delustered compositions, it is generally found that the total amount of solids, i.e., film-forming polymeric material and flatting additive, comprise from about 20 to about 60 percent by weight of the total composition. In a preferred embodiment, however, the total solids comprise an amount of from about 20 to about 45 percent by weight based on the weight of the total delustered composition. For many purposes, it may be desirable to incorporate other conventional additives such as plasticizers, corrosion inhibitors, pigments and the like and, it will be apparent that compositions containing such other additives are within the scope of this invention.

The invention will be more readily understood by reference to the following examples which describe the advantageous and unexpected results achieved by the use of the additive formulations of the present invention in the preparation of delustered compositions. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

In the following example there are described representative insoluble, infusible, particulate, non-porous urea-formaldehyde polymers useful in the preparation of the flatting combinations of the present invention and methods for the preparation thereof.

EXAMPLE A

To a suitable reaction vessel having means for the addition and removal of heat, means for measuring the temperature of the reaction mass and means for agitating the reaction mass, there is charged a solution comprising 0.315 part by weight of a sodium salt of a high molecular weight carboxymethylcellulose of the type 7HP sold by Hercules, Inc., dissolved in 15.75 parts by weight of water. To this solution 22.5 parts by weight of an aqueous 30% formaldehyde solution are added and the resultant mixture is heated to a temperature of about 70° C. and adjusted to a pH value of about 7 with a sodium hydroxide solution. There is then added with agitation 9 parts by weight of urea. Upon completion of the addition of the urea, the condensation reaction is allowed to proceed, with agitation, for a period of 3 hours while the temperature of the reaction mixture is held at about 70° C. and the pH is maintained at a value of about 7. The precondensate reaction product thus obtained is cooled to a temperature of about 50° C. and rapidly mixed with a cross-linking agent-containing solution comprising 0.485 part of sulfamic acid dissolved in 15.75 parts of water which has been heated to a temperature of about 50° C. Gel formation occurs following a period of 12 seconds at which time the temperature of the reaction mixture rises to about 65° C. The gel is maintained under adiabatic conditions for 3 hours at a temperature of 65° C. Thereafter, the gel is comminuted to a granular size of about 1 to 2 millimeters in a cutter granulator, slurried with an equal volume of water and neutralized to a pH value of 7.5 with a sodium carbonate solution. The resultant solid material is separated by filtration, washed with 60 parts of water, dried at 110° C. in a current of hot air, cooled to room temperature and deagglomerated by passage thereof through a high speed pin mill operating at 20,000 r.p.m. There is obtained 11.7 parts by weight of a fine, white, powdery, non-porous, insoluble and infusible urea-formaldehyde polymer having a BET specific surface area of about 53 square meters per gram, a molar ratio of urea to formaldehyde of 1:1.5, a true specific gravity of about 1.4, and a pour density of about 60 grams per liter.

EXAMPLE B

To a suitable reaction vessel having means for the addtion and removal of heat, means for measuring the temperature of the reaction mass and means for agitating the reaction mass, there is charged a solution comprising 0.315 part by weight of a sodium salt of a high molecular weight carboxymethylcellulose of the type 7HP sold by Hercules, Inc., dissolved in 15.75 parts by weight of water. To this solution 22.5 parts by weight of an aqueous 30% formaldehyde solution are added and the resultant mixture is heated to a temperature of about 70° C. and adjusted to a pH value of about 7 with a sodium hydroxide solution. There is then added with agitation 9 parts by weight of urea. Upon completion of the addition of the urea, the condensation reaction is allowed to proceed, with agitation, for a period of 2 hours while the temperature of the reaction mixture is held at about 70° C. and the pH is maintained at a value of about 7. The precondensate reaction product thus obtained is cooled to a temperature of about 50° C. and rapidly mixed with a cross-linking agent-containing solution comprising 0.441 part of sulfuric acid dissolved in 15.75 parts of water which has been heated to a temperature of about 50° C. Gel formation occurs following a period of 7 seconds at which time the temperature of the reaction mixture rises to about 65° C. The gel is maintained under adiabatic conditions for 2 hours at a temperature of 65° C. Thereafter, the gel is comminuted to a granular size of about 1 to 2 millimeters in a cutter granulator, slurried with an equal volume of water and neutralized to a pH value of 7.5 with a sodium carbonate solution. The resultant solid material is separated by filtration, dried for 5 hours at 110° C. in a stream of air, cooled to room temperature and deagglomerated by passage thereof through a pin mill operating at 20,000 r.p.m. There is obtained 13.6 parts by weight of a fine, white, powdery, non-porous, insoluble and infusible urea-formaldehyde polymer having a BET specific surface area of about 31.8 square meters per gram, a molar ratio of urea to formaldehyde of 1:1.5.

EXAMPLE C

To a suitable stainless steel reaction vessel, equipped with means for addition and removal of heat, means for agitation and temperature recording means, there are charged 15.75 parts by weight of water and 22.5 parts by weight of an aqueous 30% formaldehyde solution. The mixture is heated to a temperature of about 70° C. and the pH value is adjusted to 7 with a solution of sodium hydroxide. There is then added with agitation 9 parts by weight of urea. Upon completion of the addition of the urea, the temperature of the reaction mixture is held at about 70° C. and the pH value at 7 while the condensation reaction proceeds for a period of about 2 hours. The resultant precondensate reaction mixture is then cooled to a temperature of about 50° C. and is rapidly mixed with a curing catalyst-containing solution comprising 0.485 part of sulfamic acid dissolved in 15.75 parts of water which solution is maintained at 50° C. Formation of a gel commences after a 12 second period, at which time the temperature of the reaction mixture rises to about 60 to 65° C. The gel thus obtained is maintained under adiabatic conditions at a temperature of about 65° C. for about 2 hours. The resultant gel is then comminuted to a granular size of from about 1 to about 2 millimeters in a conventional cutting granulator apparatus, slurried with an equal amount of water and neutralized to a pH value of 7.5 with a solution of sodium carbonate. The solid product is recovered by filtration, dried at 110° C. in a stream of hot air for 5 hours and cooled to room temperature. The resultant product is then deagglomerated by passing the product through a high speed, i.e., 20,000 r.p.m., pin mill. There is obtained 13.6 parts by weight of a fine, white, powdery, non-porous, insoluble and infusible urea-formaldehyde polymer having a BET specific surface area of about 28.1 square meters per gram, a molar ratio of urea to formaldehyde of 1:1.6.

The following testing procedures are used in evaluating the physical properties and efficiency of the blended flatting agents of the present invention. It is, however, not intended that this invention be limited by or to such examples.

Fineness of grind.—The degree to which a pigment is dispersed in a paint vehicle is measured in accordance with ASTM Test Method D1210–54 utilizing a fineness of grind gage equipped with a Hegman scale ranging from 0 to 8.

Specular gloss.—The degree of flatting or the diffusion of reflected light from the surface of a film is measured pursuant to the method described in ASTM Test No. D–523–67, utilizing a Lockwood and McLorie Model J–3 Glossmeter. In making the determinations of degree of flatting, a beam of incident light is directed at an angle of 60, 20 and/or 85 degrees to the surface of, in this instance, a white glass plate on which there is a drawdown coating of a dry film having a thickness of 1½ mils. In the event that the film has a perfect gloss surface then the light reflectance from the surface is of the same intensity and in the same angular direction as the incident light. This is termed specular, whereas a film which completely diffuses reflected light is termed non-specular. A comparison of the intensity of reflected light with the intensity of the incident light indicates the degree of diffusion of reflected light and the degree of flatting efficiency.

Apparent viscosity (Brookfield).—Apparent viscosities are measured by means of a Brookfield viscometer operated at spindle speeds of 12 r.p.m. and 30 r.p.m., in some cases, and at speeds of 6 r.p.m. and 60 r.p.m., in other instances. The particular instrument employed herein is a Borokfield Rotary Viscometer Model LVT, produced by Brookfield Engineering Labs, Inc., of Stoughton, Mass. The Shear Thinning Index (S.T.I.), which is a measure of the shear sensitivity of a sample, is determined by measuring apparent Brookfield viscosities of the sample at two spindle speeds. The Shear Thinning Index is then obtained by merely dividing the value for viscosity measured at the lower spindle speed by the viscosity obtained at the higher spindle speed.

EXAMPLES 1–6

Water-soluble, thermosetting acrylic polymer lacquers as shown in Table I containing varying proportions of the combined flatting additive of the present invention are prepared as follows. There are charged into a suitable reaction vessel Bakelite Acrylic Resin 200 which is the registered trademark for a 55 percent solids solution of a water-soluble thermosetting acrylic polymer produced and sold by Union Carbide Corporation. To the water-soluble thermosetting acrylic polymer solution there is then added isopropyl alcohol as a solvent medium therefor, the non-porous, particulate, pigmentary urea-formaldehyde polymer of Example A, and Cab-O-Sil L-5, a non-porous, pyrogenic silica produced by Cabot Corporation having an average ultimate particle size of about 0.05 micron, a surface area of about 50 m.$^2$/gm. as determined by the Brunauer-Emmett-Teller (BET) method described in an article appearing in the Journal of the American Chemical Society, vol. 60, p. 309 (1938), a density of 7 lbs./cu. ft., a loss of 0.5% on ignition at 1000° C., a pH of 4, and a silica content of 99.8 percent. The mixture is then stirred for 5 minutes in a blender such as a Waring Blender at a rate of about 20,000 r.p.m. to effectuate an adequate dispersion. Thereafter, the resulting flatted lacquer compositions are subjected to testing for fineness of grind, apparent viscosities and degree of flatting and the results of such measurements are reported below in Table I.

TABLE II

|  | Composition (in grams) of— | | |
| --- | --- | --- | --- |
|  | Ex. 7 | Ex. 8 | Ex. 9 |
| Bakelite acrylic resin 200 | 200 | 200 | 200 |
| Isopropyl alcohol | 167 | 167 | 167 |
| Cab-O-Sil L-5 | 33 | 25 | 17.5 |
| Non-porous, pigmentary urea-formaldehyde |  | 8 | 15.5 |
| Percent solids | 35.75 | 35.75 | 35.75 |
| Grams flatting agent per 100 grams of resin solids | 30 | 30 | 30 |
| Percent urea-formaldehyde by wt. of combined flatting agent | 0 | 25 | 47 |
| Brookfield apparent viscosity: |  |  |  |
| 6 r.p.m (cps.) | 32,600 | 18,400 | 5,640 |
| 60 r.p.m. (cps.) | 3,860 | 2,310 | 1,024 |
| Shear thinning index | 8.4 | 8 | 5.5 |
| Specular gloss readings *: |  |  |  |
| 60° gloss | 31.7 | 23.3 | 16.4 |
| 85° gloss | 76.1 | 29.5 | 10.6 |
| 20° gloss | 31 | 5.1 | 2.5 |

*Specular gloss readings are average of two highly reproducible gloss readings.

A review of the above results given in Table II shows that the degree of flatting effect can be readily regulated by varying the ratio of the two components of the flatting

TABLE I

|  | Composition (in grams) of— | | | | | |
| --- | --- | --- | --- | --- | --- | --- |
|  | Ex. 1* | Ex. 2 | Ex. 3* | Ex. 4 | Ex. 5 | Ex. 6 |
| Bakelite acrylic resin 200 | 200 |  | 200 | 50 | 50 | 150 |
| Isopropyl alcohol | 167 |  | 167 | 50 | 51 | 144 |
| Cab-O-Sil L-5 | 17.5 |  | 11.7 |  |  |  |
| Urea-formaldehyde pigment | 15.5 |  | 10.3 |  |  |  |
| Composition of Example 1 |  | 100 |  | 100 |  |  |
| Composition of Example 3 |  | 97 |  |  | 97 | 97 |
| Percent solids | 35.75 | 34.85 | 33.93 | 31.62 | 30.51 | 29.52 |
| Grams flatting agent per 100 grams resin solids | 30 | 25 | 20 | 15 | 10 | 5 |
| Percent urea-formaldehyde by wt. of flatting agent | 47 | 47 | 47 | 47 | 47 | 47 |
| Fineness of grind | 4.5 | 4.5 | 5 | 5 | 5 | 5.5 |
| Brookfield apparent viscosity: |  |  |  |  |  |  |
| 12 r.p.m. (cps.) | 2,410 |  | 1,330 |  |  |  |
| 30 r.p.m.(cps.) | 1,244 |  | 688 |  |  |  |
| Shear thinning index | 1.94 |  | 1.93 |  |  |  |
| Specular gloss reading (average of two measurements): |  |  |  |  |  |  |
| 60° gloss | 16.9 | 21.8 | 29.3 | 32.3 | 45.7 | 78.1 |
| 85° gloss | 11.5 | 18.7 | 36.1 | 29.8 | 44.5 | 72.9 |
| 20° gloss | 2.5 | 4.1 | 7 | 9.4 | 17.9 | 51.7 |

*Mixtures stirred at a rate of about 20,000 r.p.m.

A study of the results for fineness of grind indicates that good dispersion for low luster lacquers is obtained. Moreover, from the above tabulated data, it becomes apparent that the gloss levels may be adjusted to the desired extent by increasing or decreasing the amount of flatting agent present in the lacquer composition. Furthermore, it is to be noted that the gloss readings shown in Table I are, in fact, the desirable levels at which flatted compositions of various levels can be obtained. It is thus obvious that the present combined flatting agent imparts many desirable properties to the composition to be delustered while, in addition, replacing conventional pebble milling or grinding with a stirring-in method for dispersing the flatting agent. As stated hereinbefore, the reported gloss readings are averages of two observed gloss readings which are characterized by a high degree of reproducibility.

EXAMPLES 7-9

Lacquer compositions are prepared, pursuant to the procedure of Example 1, by stirring, in any suitable means, such as a Waring Blender, at a rate of about 20,000 r.p.m. a mixture comprising Bakelite Water-Soluble Acrylic Resin 200, isopropyl alcohol, Cab-O-Sil L-5 pyrogenic silica produced by Cabot Corporation, and the non-porous, pigmentary urea-formaldehyde polymer of Example A which is characterized by having a BET specific surface area of about 53 m.$^2$/g., and a molar ratio of urea to formaldehyde of 1:1.5. The results obtained on these lacquer compositions are given in the following Table II.

agent while keeping constant the total amount of flatting agent.

The novel and improved combinations of non-porous, pigmentary urea-formaldehyde polymers and non-porous, pyrogenic silicas of the present invention are found to possess good settling and dispersion characteristics when utilized in delustering clear finishes. Moreover, from the foregoing results it is evident that the degree of flatting imparted to an organic polymeric film-forming composition can be carefully regulated either by varying the amount of flatting agent present in the composition as shown in Table I, or by varying the ratio of the two components of the flatting agent, as shown in Table II.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a film-forming organic polymeric material, an organic solvent for the film-forming organic polymeric material, and as a flatting agent for the composition a combination consisting of an amount of from about 20 to about 80 percent by weight of the combination of a nonporous, infusible, insoluble, paticulate, pigmentary urea-formaldehyde polymer having a molar ratio of urea to formaldehyde ranging from about 1:1 to about 1:2 and a BET specific surface area ranging from about 5 to about 100 square meters per gram and an amount of from about 80 to about 20 percent by weight of the combination of a non-porous, fumed silica having a surface area ranging from about 30 to about 100 square meters per gram, a spherical shape and a silica content of 99.8 percent, wherein the combination is present in an amount sufficient to decrease or deluster the gloss of the composition.

2. A composition as defined in claim 1 wherein the combination is present in an amount of from about 5 to about 30 percent by weight based on the weight of the film-forming organic polymeric material.

3. A composition as defined in claim 1 wherein the combination comprises an amount of from about 40 to about 60 percent by weight of the combination of the urea-formaldehyde polymer and an amount of from about 60 to about 40 percent by weight of the combination of the fumed silica.

4. A composition as defined in claim 1 wherein the urea-formaldehyde polymer has a BET specific surface area ranging from about 50 to about 80 square meters per gram.

5. A composition as defined in claim 1 wherein the fumed silica has a surface area ranging from about 40 to about 60 square meters per gram.

6. A composition as defined in claim 1 wherein the non-porous, insoluble, infusible, particulate urea-formaldehyde polymer has a molar ratio of urea to formaldehyde of 1:1.5 and a BET specific surface area of about 53 square meters per gram and the non-porous, fumed silica has a surface area of about 50 square meters per gram, a spherical shape, an average ultimate particle size of 0.05 micron, and a silica content of 99.8 percent.

7. A composition as defined in claim 1 wherein the solids content, including film-forming organic polymeric material and flatting agent, varies from about 20 to about 60 percent by weight based on the total weight of the composition.

8. A composition as defined in claim 1 wherein the solids content, including film-forming organic polymeric material and flatting agent, varies from about 20 to about 45 percent by weight based on the total weight of the composition.

9. A composition as defined in claim 1 wherein the film-forming organic polymeric material is a water-soluble, thermosetting acrylic polymer.

10. A composition as defined in claim 1 wherein the film-forming organic polymeric material is a drying oil.

11. A composition as defined in claim 1 wherein the film-forming organic polymeric material is an alkyd resin.

12. A composition as defined in claim 1 wherein the film-forming organic polymeric material is a cellulose ester.

13. A composition as defined in claim 1 wherein the film-forming organic polymeric material is a nitrocellulose.

14. A composition as defined in claim 1 wherein the film-forming organic polymeric material is a polyurethane resin.

References Cited
UNITED STATES PATENTS

| | | | |
|---|---|---|---|
| 2,541,975 | 2/1951 | Bird | 260—39 |
| 2,858,284 | 10/1958 | Acker et al. | 260—38 |
| 3,499,778 | 3/1970 | Cain, Jr. et al. | 106—288 |
| 3,656,981 | 4/1972 | Beschke et al. | 106—288 |

OTHER REFERENCES

Chem. Absts., vol. 70, 1969, "Formulation of Solvent-Based Flat Coatings," 3896ix, Feig.

WILLIAM H. SHORT, Primary Examiner

E. WOODBERRY, Assistant Examiner

U.S. Cl. X.R.

260—18, 21, 32.8 R, 33.4 R, 33.6 R, 39 P R SB, 851